March 27, 1962 G. L. CLARK ETAL 3,027,515

GENERATION OF TRAPEZOIDAL PULSE FROM RAMP AND RECTANGULAR WAVEFORMS USING DUO-DIODE SHAPING AND COMBINING CIRCUIT

Filed Aug. 19, 1960

GEORGE L. CLARK
JOHN J. HICKEY
*INVENTORS*

BY David P. Ogden

ATTORNEY 3,027,515

GENERATION OF TRAPEZOIDAL PULSE FROM RAMP AND RECTANGULAR WAVEFORMS USING DUO-DIODE SHAPING AND COMBINING CIRCUIT

George L. Clark, Hawthorne, and John J. Hickey, Lawndale, Calif., assignors to Space Technology Laboratories, Inc., Los Angeles, Calif., a corporation of Delaware Filed Aug. 19, 1960, Ser. No. 50,651
8 Claims. (Cl. 328—14)

This invention relates to a wave shaping electric circuit and more particularly to a wave shaping circuit for generating a precisely controllable waveform having a predetermined time duration.

Wave shaping circuits have been used for some time to provide various controlled voltage output characteristics. However, in certain applications such as the control of special electronic equipment of the type suitable for laboratory investigations, conventional circuitry is not completely satisfactory for certain extremely rapidly varying phenomena. Detection, and particularly detail observation of phenomena, requires rapid and precise timing of the investigatory equipment. In connection with the invention described herein, the time duration of the pulses discussed is on the order of microseconds to operate electronic shutters and sweep circuits of an electronic camera.

Because of the fast switching requirements and the appreciable capacitance of the loads associated with the application of the invention, the use of conventional vacuum tubes has not proved entirely successful. Therefore, the present invention utilizes thyratrons as switching devices.

In connection with one embodiment of the present invention, a trapezoidal waveform having a duration of approximately one microsecond is generated. The waveform generated starts at a cut-off voltage, rises abruptly to a first or initial voltage at a precisely controlled instant, rises linearly to a prescribed second voltage and then, at a prescribed instant, falls abruptly to the original cut-off voltage. In accordance with this embodiment of the invention, a first thyratron generates a rectangular waveform having a nearly instantaneous rise and fall, and a second thyratron generates a relatively slowly rising exponential or ramp waveform. Both of these waveforms are applied to a combining network in such a way that the top of the rectangular waveform is modified to have the same slope and linearity as the ramp waveform. An essential feature of this invention is that the rectangular waveform is modified simultaneously by two clipping circuits, one capable of handling large quantities of charge and giving a first approximation to the desired trapezoidal waveform, and the second one capable of handling smaller quantities of charge, but precisely controlled by the ramp waveform generated by the second thyratron and producing a trapezoidal waveform of excellent linearity.

The subject matter which is regarded as this invention is particularly pointed out and distinctly claimed in the concluding portion of this specification. The invention, however, as to its organization and operation together with further objects and advantages thereof, will best be understood by reference to the following description taken in connection with the accompanying drawing in which:

Figure 2:
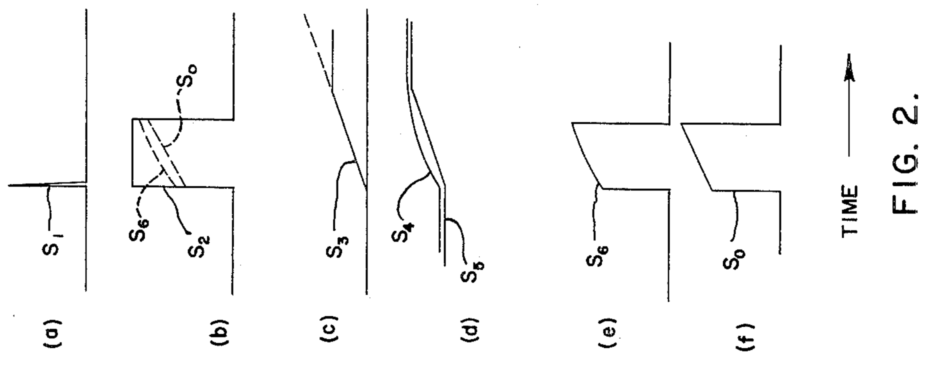
FIG. 2 illustrates several of the waveform voltages within portions of the circuit diagram of FIG. 1.
Figures 1, 3:
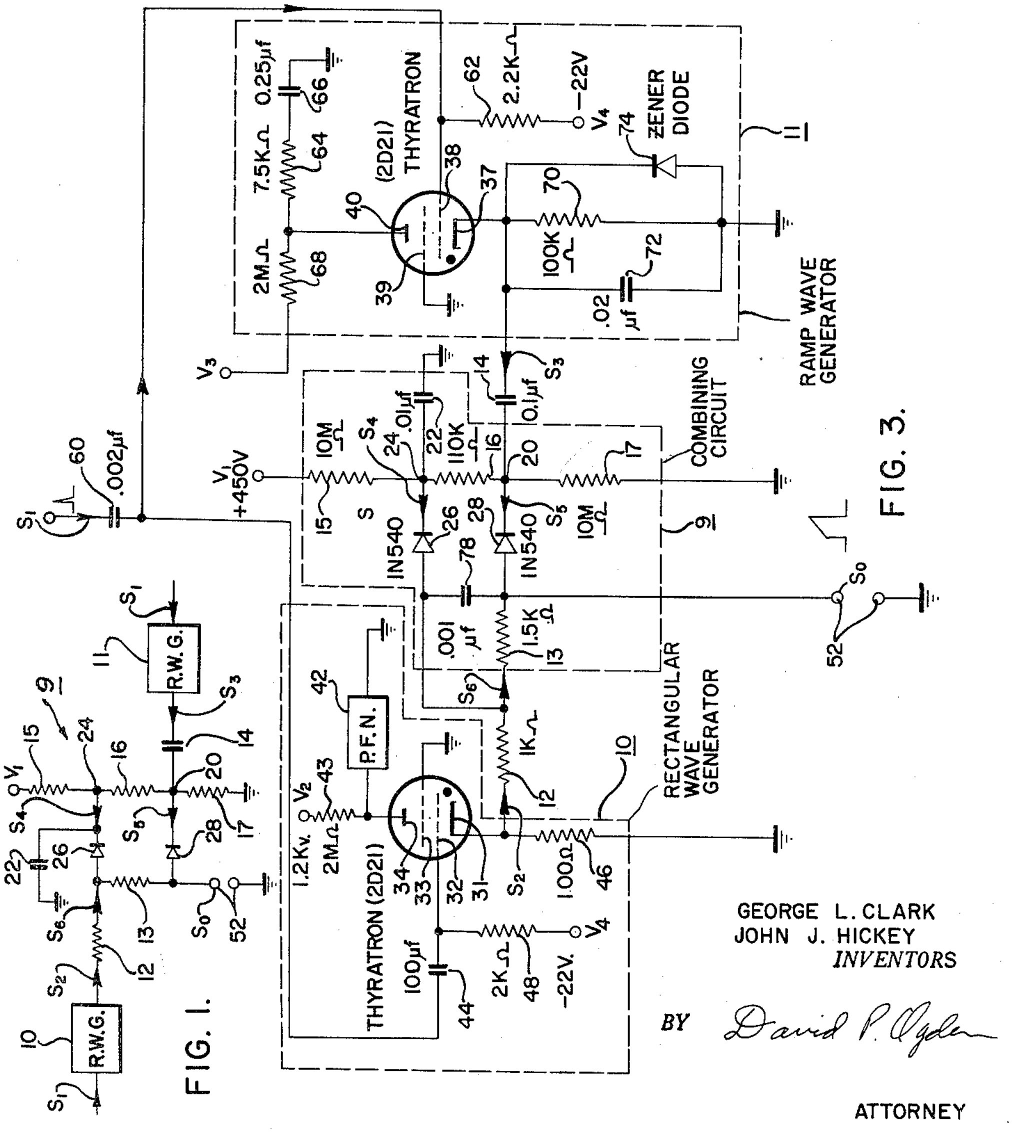
FIG. 1 is a block diagram schematic illustrating the present invention.
FIG. 3 is a schematic circuit diagram illustrating one embodiment of the present invention.

Referring now to the drawing, wherein like numbers refer to similar parts, there is shown in FIG. 1 a combining network 9. A rectangular waveform generator 10 and a ramp waveform generator 11 supply precisely controlled waveforms to the combining network 9 arrangement. A triggering pulse $S_1$ (as shown in FIG. 2*a*) is simultaneously applied to the waveform generators 10 and 11 to generate simultaneously a rectangular waveform $S_2$ (FIG. 2*b*) and a ramp waveform $S_3$ (FIG. 2*c*). The rectangular waveform $S_2$ is supplied to the combining network 9 through a voltage dividing network including a resistor 12 and a resistor 13. The ramp waveform $S_3$ is supplied to the combining network through a D.C. blocking capacitor 14 and a voltage dividing network including the resistors 15, 16, and 17. The voltage dividing network 15, 16, 17 is connected between ground and a power supply indicated as $V_1$, with the power supply being of a magnitude such that the voltage appearing at the voltage tap 20 when the triggering pulse $S_1$ is first applied, is substantially equal to the minimum voltage desired in the output trapezoidal waveform $S_o$ (FIG. 2*f*). The slope of the ramp waveform $S_3$ and the duration of the rectangular waveform $S_2$ are so related that when the maximum useful value of the ramp waveform $S_3$ is added to the voltage appearing at the voltage tap 20, the magnitude will be slightly less than the magnitude of the rectangular waveform $S_2$.

In order to obtain a simple and reliable ramp waveform generating circuit as indicated at ramp waveform generator 11 with circuit components thereof of a reasonable size and weight, it is extremely desirable that the combining network 9 does not conduct currents which will overload moderate sized elements in the ramp waveform generator 11. In accordance with the present invention, the loading of the ramp waveform generator 11 is prevented by the addition of a second means of limiting the rectangular waveform $S_2$. This means includes an additional capacitor 22 connected in circuit at a voltage tap 24 with the voltage dividing network 15, 16, 17 and a diode 26. The impedance relationship of the resistors 15, 16, 17 is such that the voltage drop across the resistor 16 is substantially less than the voltage drop across either of the resistors 15 or 17. Consequently, in the quiescent state before the application of the trigger pulse $S_1$, the voltage at the tap 24, which will be called the first reference voltage, is just slightly higher than that at the tap 20, which will be called the second reference voltage. These two reference voltages change during the operation of the circuit in such a way as to generate the desired trapezoidal waveform $S_o$. The impedances of the other components connected to the tap 24 are sufficiently low that the waveform at this point is substantially independent of the waveform at the tap 20. Thus there are two clipping circuits, operating simultaneously but independently, clipping with respect to two reference voltages whose starting values are fixed by the voltage divider 15, 16, 17, but whose later values are determined by two separate waveform generators 10 and 11. The first reference voltage has an exponential form due to the charging of capacitor 22 through resistor 12. The resulting clipped waveform is approximately trapezoidal as shown in FIG. 2*e* and is designated $S_6$. The second reference voltage increases linearly with time due to the action of the ramp waveform generator 11, and the resultant final clipped waveform is the desired trapezoidal waveform $S_o$ shown in FIG. 2*f*.

The rectangular waveform $S_2$ is of a voltage magnitude greater than that appearing at the voltage tap 24 during application of the ramp waveform $S_3$ to the mixing circuit. Thus, a first diode 26 will become conductive in accordance with the relative magnitudes of the rectangular waveform $S_2$ and the voltage appearing at the voltage tap 24 to limit or clip the voltage of the rectangular waveform $S_2$ and thus generate an approximately trapezoidal waveform $S_6$ (FIG. 2*e*). However, because of the charging of the capacitor 22, the top of the approximately trapezoidal waveform $S_6$ will have an exponential curvature. Moreover, because of the fact that the voltage tap 24 has the exponential ramp waveform $S_4$ (FIG. 2*d*) of magnitude thereacross which is always slightly larger than that of $S_5$ (FIG. 2*d*), appearing at the voltage tap 20, the application of the exponential ramp waveform $S_4$ at the same time as the approximately trapezoidal waveform $S_6$ to a second diode 28 will cause a predetermined and very small current flow through the second diode 28 and further limit the rectangular waveform $S_2$ to obtain a desired output trapezoidal waveform $S_o$. Suitable voltage relationships of waveforms $S_2$, $S_6$, and $S_o$ are indicated in dashed lines in the FIG. 2*b*.

As a result of the particular arrangement of the impedance characteristics of the above described combining network 9, the current flow through the second diode 28 is maintained at a low level as a function of the voltage difference between the waveforms $S_6$ and $S_o$ instead of the difference between the waveforms $S_2$ and $S_o$, whereby a tendency to overload the ramp waveform generator 11 has been substantially eliminated. As will be seen more clearly from the following discussion of FIG. 3, the present invention results in the output trapezoidal waveform $S_o$ having extremely sharp rise and fall with a substantially completely linear variation of the magnitude of the waveform between the rise and fall voltages. The rectangular waveform generator 10 precisely controls the duration of the output trapezoidal waveform $S_o$, and the ramp waveform generator 11 precisely controls the linearity and the slope of the rise in magnitude of the output trapezoidal waveform $S_o$. Moreover, the use of other waveform generators taking advantage of the independent double clipping arrangement of the combining circuit will result in precise control of other waveforms without loading of the final waveform shaping circuit (11).

Referring now to FIG. 3 there is shown a switching device and waveform generator circuit shown as a first thyratron tube circuit 10 with the tube itself having a cathode 31, a starting or ionizing grid 32, a screen grid 33, and an anode 34. One thyratron tube sutiable for operation in the circuit 10 is commonly marketed as a 2D21. There is also shown a second switching device and waveform generating circuit shown as a thyratron tube circuit 11 with the tube itself having a cathode 37, an ionizing grid 38, a screen grid 39, and an anode 40. As is well known, a gas filled thyratron tube will become conductive, much like a switch means, when the voltage of the grid is raised above a certain negative threshold voltage. Once the tube is conductive it is necessary to reduce the voltage thereacross, as by reducing the voltage at the anode, to terminate current flow. Thus, voltage variations at the ionizing grid will not materially affect the rate of current flow through the tube once it becomes conductive. Of even greater importance is the very low impedance of the conducting tube, which makes it extremely useful as a waveform generator switching device.

In order that the thyratron tube circuit 10 will provide a rectangular pulse of superior rise time, it is supplied a high voltage triggering pulse $S_1$ and is energized from a pulse forming network 42 such as a delay line or the like. When a delay line is used as the pulse forming network, it is a preferred practice to provide desired impedance matching components to assure cut-off at a desired instant. In the particular thyratron tube circuit 10 illustrated, the initial voltage $V_2$ of the anode 34 (also applied to the pulse forming network 42) is established at 1.2 killivolts through a large resistor 43 during the period when the tube is non-conductive. The sharp rising triggering pulse $S_1$ is applied to the ionizing grid 32 through a D.C. blocking capacitor 44 to raise the grid voltage from cut-off to substantially above the voltage of the cathode 31. As shown, during the inert periods of the thyratron tube, the cathode is substantially at ground or zero voltage because of the connection thereto through a cathode load resistor 46. Prior to the application of the triggering pulse $S_1$ the ionizing grid 32 is biased to a cut-off voltage $V_4$, such as 22 volts negative, to prevent firing or ionization of the thyratron tube. In order that any current flow through the ionizing grid 32 may be returned to the system without materially affecting the negative bias voltage supply, a grid resistor 48 is connected in the grid current return circuit. The pulse forming network 42 is of the type presenting to the anode 34 a fixed voltage equal to about one half that of the power supply voltage, so long as the tube is conductive and presenting to the tube a voltage of substantially zero at the termination of the desired rectangular waveform $S_2$.

The desired rectangular waveform $S_2$ is obtained across the cathode load resistor 46. This rectangular waveform $S_2$ is applied through portions of the combining network 9 to the output terminals 52 in the form of the output trapezoidal waveform $S_o$.

In order to obtain the desired abrupt rise during the initial portion of the rectangular waveform $S_2$ and the similarly abrupt fall of the latter portion of the rectangular waveform $S_2$, the use of a thyratron tube has decided advantages. However, the creation of a sloping or ramplike top portion has proved difficult when utilizing a simple and reliable pulse forming network 42, enhancing abrupt rise and fall. A more precisely controllable arrangement is illustrated in FIG. 3 wherein coordinated sloping or ramp voltages are applied to the rectangular waveform $S_2$ to obtain the desired output trapezoidal waveform $S_o$.

Referring now to the portion of the circuit controlling the operation of the second thyratron tube circuit 11, the ionizing grid 38 has applied thereto the triggering pulse $S_1$ through a capacitor 60 and has a similar grid resistor 62 in circuit therewith. As shown, the triggering pulse $S_1$ comes from a single source so that both of the thyratron tube circuits 10 and 11 are energized at the same instant. However, the voltage applied to the second thyratron tube circuit 11 during its conductive period is substantially different from that supplied by the pulse forming network 42, because of the utilization of a resistor 64 and capacitor 66 which are initially charged through a load resistor 68 to a voltage of two kilovolts $V_3$ and discharged relatively slowly during conductance of the thyratron tube in the form of an exponential voltage of the type normal to RC circuits. As specifically illustrated in FIG. 3, the voltage $V_3$ is large and the capacitance of the capacitor 66 is large compared to that of the capacitor 72. Although the capacitor 72 may be substantially smaller than the capacitor 66, the capacitor 72 must be made large enough for the currents involved during time durations of interest to clip the approximately trapezoidal waveform $S_6$ from a comparatively low impedance source without an appreciable change in voltage due to the charging of the capacitor 72.

In FIG. 3 there are again illustrated the circuit components of the combining network 9 of FIG. 1 which are requisite to obtaining the desired output trapezoidal waveform $S_o$. These components include the voltage dividing network 15, 16, 17 connected between ground and the power supply $V_1$. The ramp waveform $S_3$ appearing across the capacitor 72 is applied to the voltage dividing network at the voltage tap 20 through the D.C. blocking capacitor 14. Thus, the voltage appearing across the resistor 17 as modified by the voltage applied through the D.C. blocking capacitor 14 provides a reference voltage for the diode 28 to clip the approximately trapezoidal waveform $S_6$ and create the output trapezoidal waveform $S_o$.

In accordance with the present invention it should be re-emphasized that, in order to reduce the loading of (or charging current flow to) the capacitor 72 to an acceptable range which will not create an exponential variation of the voltage thereacross, another and independently operating prior clipping circuit is provided in the form of the previously introduced diode 26 and capacitor 22, which are connected to the voltage tap 24 between resistors 15 and 16. This results in an initial clipping of the rectangular waveform $S_2$ to the exponential waveform $S_4$ appearing at the voltage tap 24. However, because of the utilization of the capacitor 22, which receives substantial charging currents, this first clipping has an exponential curvature.

The above discussion presents an embodiment of the present invention. The following disclosure is directed to specific considerations which will enable a most economic utilization of various elements of the invention.

In order to limit the voltage capacity required of the capacitor 72 to reasonable values, the Zener diode 74 is connected in circuit thereacross to become conductive when the voltage across the capacitor 72 is above that necessary for formation of the output trapezoidal waveform $S_0$. The slope of the ramp waveform $S_3$ is precisely controlled so that the utilization of the Zener diode 74 is required only during a period after termination of the output trapezoidal waveform $S_0$. As shown in FIG. 2*c*, indicating the range of voltage variation across the capacitor 72, the dash-line is the range of voltage variation which would occur in the absence of a voltage limiting device such as the Zener diode 74. In this particular portion of the circuit other types of voltage limiting devices may be used such as gas filled voltage regulators which become conductive upon the reaching of a predetermined voltage.

In the combining network 9, illustrated in FIG. 3, there is also provided a compensating capacitor 78 which prevents the rounding of the leading edge of the approximately trapezoidal waveform $S_6$ which would otherwise occur due to the integrating action of the diode 28 capacitance charging through resistor 13.

It is preferred that the size of the D.C. blocking capacitor 14 is selected to provide an RC time constant between the capacitor 14 and the resistors associated therewith which is large enough so that the ramp waveform $S_3$, created across the resistor 70, is faithfully transmitted to the diode 28. The resistors 15, 16, 17, 43, 68, and 70 are not influential of the waveforms during the transmission of the desired output trapezoidal waveform $S_0$, but function primarily to re-establish the desired potentials of the other circuit elements between the transmission of the output trapezoidal waveforms $S_0$.

What is claimed is:

1. A wave shaping electric circuit comprising: a first voltage dividing network having a first and a second voltage tap thereon, said first voltage tap having a first voltage slightly greater than a second voltage on said second voltage tap; a first generator for generating a linearly increasing ramp waveform and being coupled to said second voltage tap, whereby the rate of rise of said second voltage is substantially equal to that of said ramp waveform; an output terminal; a low impedance output second waveform generator for generating a rectangular waveform having a voltage magnitude greater than said first voltage; a second voltage dividing network coupling said second generator to said output terminal; a single intermediate voltage tap on said second voltage dividing network; first unidirectional current means coupling said single voltage tap to said first voltage tap in a sense limiting the voltage of said single voltage tap to said first voltage; triggering means cooperating with said first generator and said second generator for simultaneously initiating said ramp waveform and said rectangular waveform whereby said rectangular waveform is clipped to provide an approximately trapezoidal waveform at said single voltage tap of a magnitude equal to said first voltage; a current storage capacitor coupled to said first voltage tap and being arranged to be charged by current flow through said first unidirectional current means resulting from the clipping of said rectangular waveform; and a second unidirectional impedance means connected between said output terminal and said second voltage tap to conduct current proportional to the difference between said second voltage and said first voltage, and thereby to clip said approximately trapezoidal waveform to provide an output trapezoidal waveform having rising voltage substantially identical to the rising voltage of said ramp waveform and having a time duration defined by said rectangular waveform.

2. A wave shaping electric circuit comprising: a first voltage divider having a first and a second voltage tap thereon, having a first voltage slightly greater than a second voltage respectively; a first generator for generating a linearly increasing ramp waveform; a D.C. blocking means coupling the output of said first generator to said second tap whereby the rate of use of said second voltage is substantially equal to that of said ramp waveform; an output terminal; a second waveform generator for generating a rectangular waveform having a voltage magnitude greater than said first voltage; a second voltage divider coupling said second generator to said output terminal; a single intermediate voltage tap on said second voltage divider; a first diode coupling said single tap to said first tap to limit the voltage of said single tap to said first voltage; triggering means cooperating with said first generator and said second generator for simultaneously initiating said ramp waveform and said rectangular waveform; a current storage capacitor coupled to said second voltage tap and being arranged to store charge flowing through said first diode during the clipping of said rectangular waveform to said first voltage; and a second diode coupling said output terminal to said second tap to conduct current proportional to the difference between said second voltage and said first voltage, and thereby to clip said approximately trapezoidal waveform to an output trapezoidal waveform having voltage magnitude variation substantially identical to the voltage variation of said ramp waveform and having a time duration defined by said rectangular waveform, said first voltage and said second voltage having relative magnitudes which will cause small current flow through said second diode compared to the current flow through said first diode.

3. A wave shaping electric circuit for generating a predetermined output waveform, comprising: a first waveform generator for generating a first waveform; a high impedance voltage divider network connected between ground and a voltage source and having a first and a second voltage tap with the impedance between said voltage taps such that a first voltage at said first tap is initially greater by a relatively small magnitude than a second voltage at said second voltage tap whereby clipping the first voltage to a value equal to said second voltage will cause only small current flow; a first diode connected in circuit with said first voltage tap in a sense allowing current flow to said first voltage tap; a capacitor connected between said first voltage tap and ground, serving as a reservoir for charge conducted by said first diode and by its magnitude relationship to the charging circuit resistance increasing its voltage at a rate which provides an approximation to a desired output waveform; a first impedance means coupling said first waveform generator to said first diode, the voltage magnitude of said first waveform being substantially greater than said first voltage whereby said diode becomes conductive of current and said capacitor is charged thereby; a second impedance means connecting a junction between said first diode and said first impedance means to an output terminal; a second diode connected between the output terminal and second voltage tap in a sense allowing current flow from said output terminal to said second voltage tap to thereby clip the output waveform magnitude to that appearing at said second voltage tap without causing substantial changes in current flow to said second voltage tap; and means for coupling a second waveform generator to said second voltage tap to regulate the magnitude of the clipped output waveform, said first waveform generator and said second waveform generator being operable simultaneously.

4. A wave shaping electric circuit as defined in claim 3 wherein said second waveform generator generates a linear ramp waveform whereby the output waveform has a predetermined linearly increasing voltage magnitude.

5. A wave shaping electric circuit as defined in claim 3 wherein said first waveform generator generates a rectangular waveform whereby the output waveform has time duration precisely controlled by said first waveform generator.

6. A wave shaping electric circuit comprising: a first thyratron tube circuit for generating a rectangular waveform having substantially instantaneous rise and fall voltages of at least about one hundred volts spaced a precise time duration apart with the time duration being on the order of one to ten microseconds; an output terminal; circuit means connected between said first thyratron tube circuit and said output terminal including a first voltage dividing network; a second thyratron tube circuit for generating a linear ramp waveform having a time duration greater than said rectangular waveform; a second voltage divider network arranged to have a unidirectional voltage on the order of at least two hundred volts thereacross, including a first voltage tap initially at a first voltage and second voltage tap arranged to have a second voltage initially slightly less than said first voltage; D.C. blocking electric circuit means coupling said second tube circuit to said second voltage divider network to increase linearly in time the voltage at said second voltage tap; means for initiating said rectangular waveform and said ramp waveform simultaneously; first unidirectional electric circuit means coupling a voltage tap of said first divider network to said first voltage tap and being arranged to limit the voltage magnitude of said rectangular waveform to said first voltage, the voltage relationship of said rectangular waveform and said first voltage being such that said rectangular waveform is always at least as great as said second voltage, whereby the rectangular waveform is limited to said first voltage to form an approximately trapezoidal waveform; a storage capacitor connected to said first voltage tap to receive a major portion of the current flow through said first unidirectional electric circuit means; and a second unidirectional electric circuit means coupling said output terminal to said second voltage tap to clip further said approximately trapezoidal waveform to obtain a trapezoidal waveform having a magnitude variation defined by the variation of said ramp waveform and a time duration defined by said rectangular waveform.

7. A wave shaping electric circuit comprising: first means for generating a rectangular waveform having substantially instantaneous rise and fall a precise time duration apart with the time duration being on the order of one microsecond; an output terminal; circuit means including a resistor with one end of said resistor coupled to said output terminal and the other end to said first means; second means for generating a linear ramp waveform; a triggering arrangement for energizing said first means and said second means simultaneously; a high impedance voltage dividing network arranged to have a unidirectional voltage thereacross and including a first voltage tap initially at a first voltage and second voltage tap having a second voltage initially slightly less than said first voltage; D.C. blocking electric circuit means coupling said second means to said network to increase linearly the magnitude of said second voltage; a first clipping diode connecting said other end of said resistor to said first voltage tap, said first diode being arranged to limit the magnitude of said rectangular waveform to said first voltage, said rectangular waveform having a voltage magnitude greater than said first voltage to cause a clipping current flow through said first diode to form an approximately trapezoidal waveform at said other end; a chargeable current storage means connected to said first voltage tap to receive a major portion of the clipping current flow for regulating the voltage excursion at said first voltage tap; and a second clipping diode coupling said output terminal to said second voltage tap to limit said approximately trapezoidal waveform to said second voltage and thus generate a trapezoidal output waveform without loading said second means.

8. A wave shaping electric circuit comprising: first means for generating a rectangular waveform; an output terminal; circuit means including a resistor coupled at one end to said output terminal and at the other end to said first means; second means for generating a linear ramp waveform; a triggering arrangement for energizing said first means and said second means simultaneously; a high impedance voltage dividing network arranged to have a unidirectional voltage thereacross and including a first voltage tap initially at a first voltage and second voltage tap having a second voltage at a slightly lower magnitude which is less than the magnitude of said rectangular waveform; circuit means coupling said second means to said network to increase linearly the magnitude of said second voltage; a first clipping diode connecting said other end to said first voltage tap and being arranged to limit the magnitude of said rectangular waveform to said first voltage and thus provide a clipping current flow therethrough to form an approximately trapezoidal waveform at said other end; a capacitor connected to said first voltage tap to receive a major portion of the clipping current flow for regulating the voltage excursion at said first voltage tap; and a second clipping diode coupling said output terminal to said second voltage tap to limit said approximately trapezoidal waveform to said second voltage and thus generate a trapezoidal output waveform.

References Cited in the file of this patent

UNITED STATES PATENTS

| | | |
|---|---|---|
| 2,895,784 | Rocha | July 21, 1959 |
| 2,953,679 | Rush | Sept. 20, 1960 |